(12) United States Patent
Liu et al.

(10) Patent No.: US 11,638,270 B2
(45) Date of Patent: Apr. 25, 2023

(54) TECHNIQUES FOR CONFIGURING SEARCH SPACES IN MULTICAST/BROADCAST SERVICE (MBS) WIRELESS COMMUNICATIONS

(71) Applicant: QUALCOMM Incorporated, San Diego, CA (US)

(72) Inventors: Le Liu, Fremont, CA (US); Alberto Rico Alvarino, San Diego, CA (US); Peter Gaal, San Diego, CA (US); Xiaoxia Zhang, San Diego, CA (US); Tao Luo, San Diego, CA (US); Kazuki Takeda, Tokyo (JP); Prasad Reddy Kadiri, San Diego, CA (US); Ayan Sengupta, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 95 days.

(21) Appl. No.: 17/142,998

(22) Filed: Jan. 6, 2021

(65) Prior Publication Data
US 2021/0250958 A1  Aug. 12, 2021

Related U.S. Application Data

(60) Provisional application No. 62/972,490, filed on Feb. 10, 2020.

(51) Int. Cl.
*H04W 4/00* (2018.01)
*H04W 72/10* (2009.01)
(Continued)

(52) U.S. Cl.
CPC .............. *H04W 72/10* (2013.01); *H04W 4/06* (2013.01); *H04W 72/042* (2013.01); *H04W 72/0453* (2013.01); *H04W 72/0493* (2013.01)

(58) Field of Classification Search
None
See application file for complete search history.

(56) References Cited

U.S. PATENT DOCUMENTS

2013/0250906 A1* 9/2013 Golitschek Edler von Elbwart ... H04L 5/0053
370/330
2018/0367386 A1* 12/2018 Liao ...................... H04W 48/00
(Continued)

OTHER PUBLICATIONS

Ericsson: "Scheduling Enhancements", 3GPP TSG-RAN WG2 #106, 3GPP Draft; R2-1906932—Scheduling Enhancement, 3rd Generation Partnership Project (3GPP), Mobile Competence Centre, 650, Route Des Lucioles, F-06921 Sophia-Antipolis Cedex, France, vol. RAN WG2. No. Reno, USA; May 13, 2019-May 17, 2019, May 13, 2019 (May 13, 2019), pp. 1-9, XP051730384, Retrieved from the Internet: URL: https://www.3gpp.org/ftp/TSG_RAN/WG2_RL2/TSGR2_106/Docs/R2-1906932.zip [retrieved on 2019-0 -13], Section: 2.4; p. 7-p. 8.

(Continued)

*Primary Examiner* — Abdelillah Elmejjarmi
(74) *Attorney, Agent, or Firm* — Arent Fox, LLP

(57) ABSTRACT

Aspects described herein relate to indicating search spaces and/or control information formats for receiving multicast/broadcast service (MBS) downlink control information (DCI). A device can receive a search space configuration defining one or more search spaces for detecting communications intended for a group of one or more user equipment (UEs), determine a priority for detecting control information transmitted over a control channel based on the one or more search spaces, and perform, based on the priority, detection for the control information over the control channel based on the one or more search spaces and/or the other defined search spaces.

30 Claims, 6 Drawing Sheets

(51) Int. Cl.
    *H04W 72/04*     (2023.01)
    *H04W 72/0453*     (2023.01)
    *H04W 4/06*     (2009.01)

(56) References Cited

U.S. PATENT DOCUMENTS

| | | | |
|---|---|---|---|
| 2019/0223164 A1* | 7/2019 | He | H04L 25/0204 |
| 2019/0281418 A1 | 9/2019 | Chen et al. | |
| 2019/0297606 A1 | 9/2019 | Kim et al. | |
| 2021/0274320 A1* | 9/2021 | Chen | H04W 72/042 |
| 2021/0352621 A1* | 11/2021 | Hayashi | H04W 48/12 |
| 2022/0166591 A1* | 5/2022 | Aiba | H04L 5/0055 |

OTHER PUBLICATIONS

International Search Report and Written Opinion—PCT/US2021/012500—ISA/EPO—dated Apr. 26, 2021.

* cited by examiner

TECHNIQUES FOR CONFIGURING SEARCH SPACES IN MULTICAST/BROADCAST SERVICE (MBS) WIRELESS COMMUNICATIONS

CLAIM OF PRIORITY UNDER 35 U.S.C. § 119

The present Application for Patent claims priority to Provisional Patent Application No. 62/972,490, entitled "TECHNIQUES FOR CONFIGURING SEARCH SPACES IN MULTICAST WIRELESS COMMUNICATIONS" filed Feb. 10, 2020, which is assigned to the assignee hereof and hereby expressly incorporated by reference herein for all purposes.

BACKGROUND

Aspects of the present disclosure relate generally to wireless communication systems, and more particularly, to multicast/broadcast service (MBS) communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In wireless communication technologies such as 5G NR, downlink control information (DCI) formats are defined for transmitting DCI to user equipment (UEs), where the DCI can indicate resources for the UEs to use in unicast communications with a base station. Search spaces over which the UEs can search for DCI signals are also defined and configured for the UEs. The search spaces may include common search spaces (CSSs) common to multiple UEs and/or UE-specific search spaces (USSs) that are defined for a given UE. A search space can be defined by frequency and time domain resources for monitoring for DCI transmitted by a base station.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication is provided. The method includes receiving a search space configuration defining one or more search spaces for detecting communications intended for a group of one or more user equipment (UEs), determining a priority for detecting a control channel based on the one or more search spaces, wherein determining the priority comprises at least one of: prioritizing the one or more search spaces over other defined search spaces for detecting the control information over the control channel; or prioritizing, in the one or more search spaces, one or more control information formats over other control information formats of control information for detecting the control information over the control channel, and performing, based on the priority, detection for the control channel in received communications based on the one or more search spaces and/or the other defined search spaces.

In another example, a method for wireless communications is provided. The method includes generating a search space configuration defining one or more search spaces for detecting communications intended for a group of one or more UEs, indicating a priority of the one or more search spaces to at least one of: prioritize the one or more search spaces over other defined search spaces for detecting control information over the control channel; or prioritize, in the one or more search spaces, one or more control information formats over other control information formats of control information for detecting the control information over the control channel, and transmitting the search space configuration to the group of one or more UEs.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

For example, an apparatus for wireless communication is provided that includes a transceiver, a memory configured to store instructions, and one or more processors communicatively coupled with the memory and the transceiver. The one or more processors are configured to receive a search space configuration defining one or more search spaces for detecting communications intended for a group of one or more UEs, determine a priority for detecting control information transmitted over a control channel based on the one or more search spaces, wherein determining the priority comprises at least one of: prioritizing the one or more search spaces over other defined search spaces for detecting the control information over the control channel; or prioritizing, in the one or more search spaces, one or more control information formats over other control information formats of control information for detecting the control information over the control channel, and perform, based on the priority, detection for the control information over the control channel based on the one or more search spaces and/or the other defined search spaces.

In another example, an apparatus for wireless communication is provided that includes a transceiver, a memory configured to store instructions, and one or more processors communicatively coupled with the memory and the transceiver. The one or more processors are configured to generate a search space configuration defining one or more search spaces for detecting communications intended for a group of one or more UEs, indicate a priority of the one or more search spaces for detecting a control channel to at least one of: prioritize the one or more search spaces over other defined search spaces for detecting control information over the control channel; or prioritize, in the one or more search spaces, one or more control information formats over other control information formats of control information for detecting the control information over the control channel, and transmit the search space configuration to the group of one or more UEs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
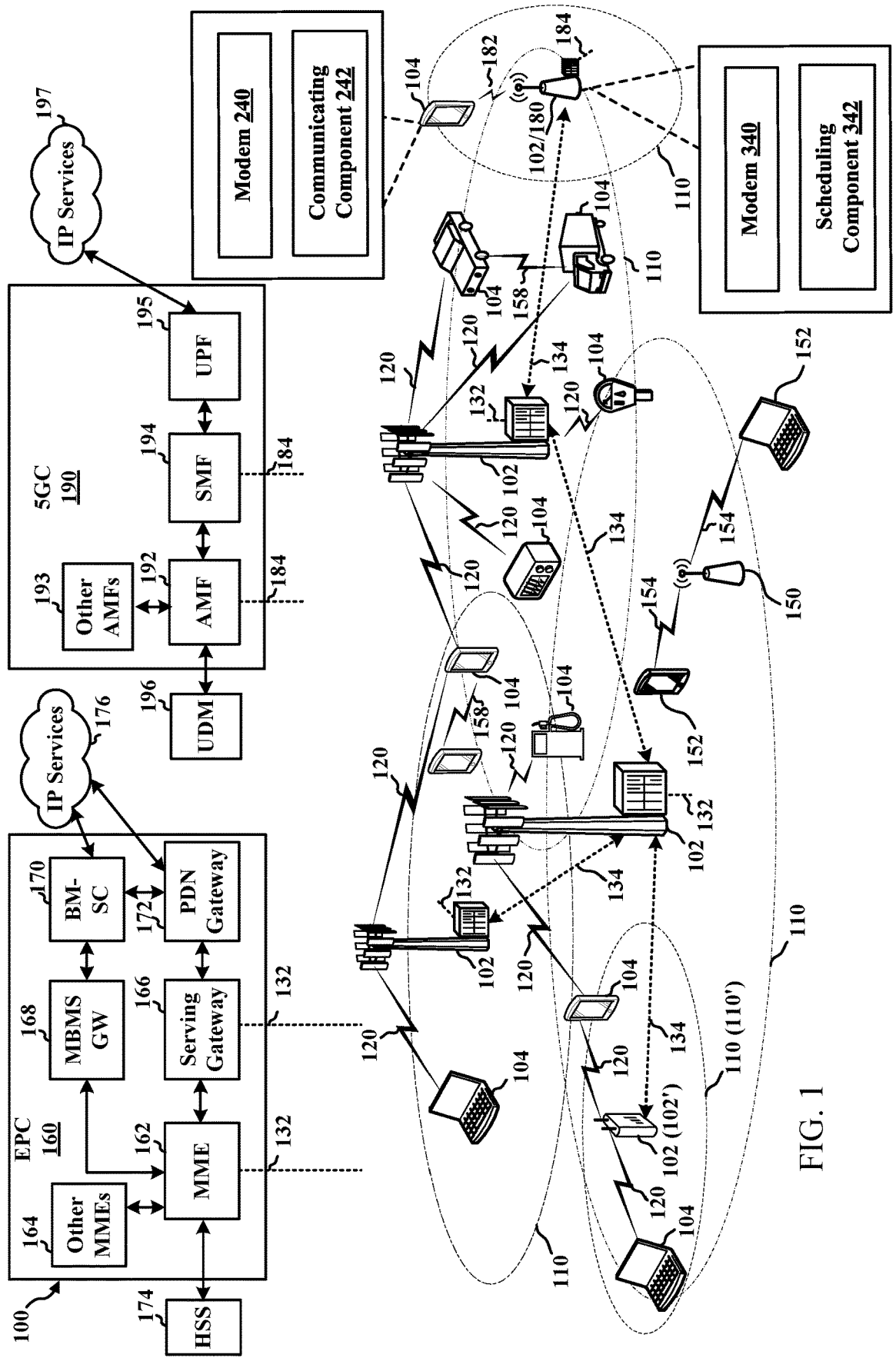
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to configuring search spaces for monitoring for DCI formats for multicast and/or broadcast service (MBS) communications. For example, MBS communications can correspond to communications intended to be received by multiple devices. In an example, a base station can transmit MBS communications over resources (e.g., frequency and/or time resources) over which multiple user equipment (UEs) can concurrently detect and/or receive the MBS communications. In an example, DCI formats for MBS communications can be of a different format than DCI formats for unicast or other communications (and/or can be constructed based on a DCI format for unicast or other communications but with different MBS communication information). In an example, a user equipment (UE) can be configured to monitor for DCI formats related to MBS communications with higher priority and/or more frequently than for other DCI formats (e.g., DCI formats related to unicast communications) to facilitate detection of DCI for MBS only or of DCI for MBS before DCI for other types of communications. For example, the UE can prioritize DCI sizes for MBS, determine a reduced number of candidates for blind detection for MBS (e.g., by using a subset of aggregation levels), etc.

In a specific example, a DCI format can include a special set of information for scheduling channels in wireless communications, such as downlink data channel (e.g., physical downlink shared channel (PDSCH)), uplink data channel (e.g., physical uplink shared channel (PUSCH)), etc. In fifth generation (5G) new radio (NR), for example, DCI Formats 0_0 and 0_1 are defined for the scheduling of PUSCH in one cell, and DCI Formats 1_0 and 1_1 are defined for the scheduling of PDSCH in one cell (e.g., as specified in third generation partnership project (3GPP) technical specification (TS) 38.212, Table 7.3.1-1). For DCI formats for data scheduling, in an example, DCI formats 1_0, 0_0, can be considered fallback DCI that support a limited set of features, have less overhead than other DCI formats, can be used during transition period of feature configuration, e.g., radio resource control (RRC) reconfiguration in which case the network does not know the exact time when the UE has applied the configuration, etc. In addition, in this example, DCI formats 1_1, 0_1, can be considered non-fallback DCI that support additional (e.g., all) features, such as cross-carrier scheduling, bandwidth part (BWP) switching, etc., configured to the UE, which may not be supported by the fallback DCI. Flexibility and size of the non-fallback DCI format can vary depending on the active configuration.

In a specific example, a search space set can be defined as a configuration for time domain pattern for monitoring occasions for monitoring for DCI. For example, the configuration may include or indicate a starting symbol or slot for the search space (e.g., the symbol or slot at which to start monitoring), a periodicity for the search space (e.g., measured in symbols or slots), etc., aggregation level, number candidate, UE-specific search space (USS) or common search space (CSS), associated DCI formats, etc. For example, a symbol can correspond to an orthogonal frequency division multiplexing (OFDM) symbol including a portion of frequency resources (e.g., resource blocks) over a period of time. In an example, a slot can include multiple consecutive symbols (e.g., OFDM symbols). In any case, the UE configured with DCI formats and a search space set can monitor the search spaces during the defined monitoring occasions, which can include searching the search spaces in the set for signals that are based on the DCI formats.

For example, a UE PDCCH blind detecting procedure may include the following steps: 1) UE gets the PDCCH configuration information in a range of physical resources based on a control resource set (CORESET) and search space (SS) set configuration; 2) in the range of physical resources, UE applies different PDCCH configuration parameters (e.g., aggregation level (AL), number of PDCCH candidates per AL, radio network temporary identifier (RNTI), etc.) to figure out the possible locations and control channel elements (CCEs) where PDCCH is transmitted (e.g., PDCCH candidates); and 3) the UE applies RNTI based scrambling mask for each PDCCH candidate and gets the PDCCH/DCI by blind detection. In this example, the UE can perform blind decode to detect DCI in each configured search space set occasion. In one example, uplink (UL) and downlink (DL) DCIs can be size matched (e.g., in the case of fallback DCIs) such that one blind decode may be used for both UL and DL, and size matched UL and DL DCIs can further be differentiated by DCI content. In another example, UL and DL DCIs may not be size matched (e.g., in the cast of non-fallback DCIs), such that separate blind decodes can be used to detect UL and DL non-size matched DCIs.

Aspects described herein relate to efficiently configuring the search space for monitoring DCI format of MBS communications (e.g., as opposed to, or in addition to, unicast communications). Currently, search space set configuration in NR bundles DCI format 1_1 and 0_1 together. For devices receiving NR MBS, DL grant (e.g., DCI format 1_0 or 1_1 or MBS formats based on these DCI formats) for MBS may be monitored more frequently than unicast UL grant (e.g., DCI format 0_0 or 0_1) and unicast DL grant in configured time, frequency, and/or space resources for MBS. For example, CSS and USS for monitoring DL grant for MBS can be configured with priority for the DCI formats related to DL grant in MBS. Configuring priority for the DCI formats can include prioritizing the search spaces, prioritizing certain DCI formats related to MBS communications, and/or the like. In one example, a UE receiving information regarding DCI formats for MBS communications can prioritize these DCI formats over DCI formats related to unicast communications. In addition, parameters related to the search spaces and/or DCI formats can be modified to facilitate more frequently monitoring for DCI formats related to MBS communications. In any case, DCI formats for MBS communications can be more frequently monitored to facilitate receiving the MBS communications more efficiently when available.

The described features will be presented in more detail below with reference to FIGS. 1-6.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for prioritizing search spaces and/or DCI formats, in accordance with aspects described herein, and some nodes may have a modem 340 and scheduling component 342 for configuring search spaces and/or DCI formats, in accordance with aspects described herein. Though a UE 104 is shown as having the modem 240 and communicating component 242 and a base station 102/gNB 180 is shown as having the modem 340 and scheduling component 342, this is one illustrative example, and substantially any node or type of node may include a modem 240 and communicating component 242 and/or a modem 340 and scheduling component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, scheduling component 342 can generate and transmit DCI related to MBS communications. The DCI for MBS communications can be of an existing DCI format (e.g., a DCI format defined for unicast communications), which may be modified for MBS communications, and/or may be indicated as related to MBS based on a RNTI used to scramble the DCI, an indicator in the DCI, etc. In an example, communicating component 242 can receive the DCI and can determine that the DCI is for MBS communications based on the RNTI used to scramble the DCI, an indicator in the DCI, etc. Communicating component 242 can also accordingly determine a format of the DCI for processing the DCI to obtain parameters or other information related to receiving the MBS communications. Scheduling component 342 can transmit the MBS communications, and communicating component 242 can receive the MBS communications, based on the DCI.

Figure 2:
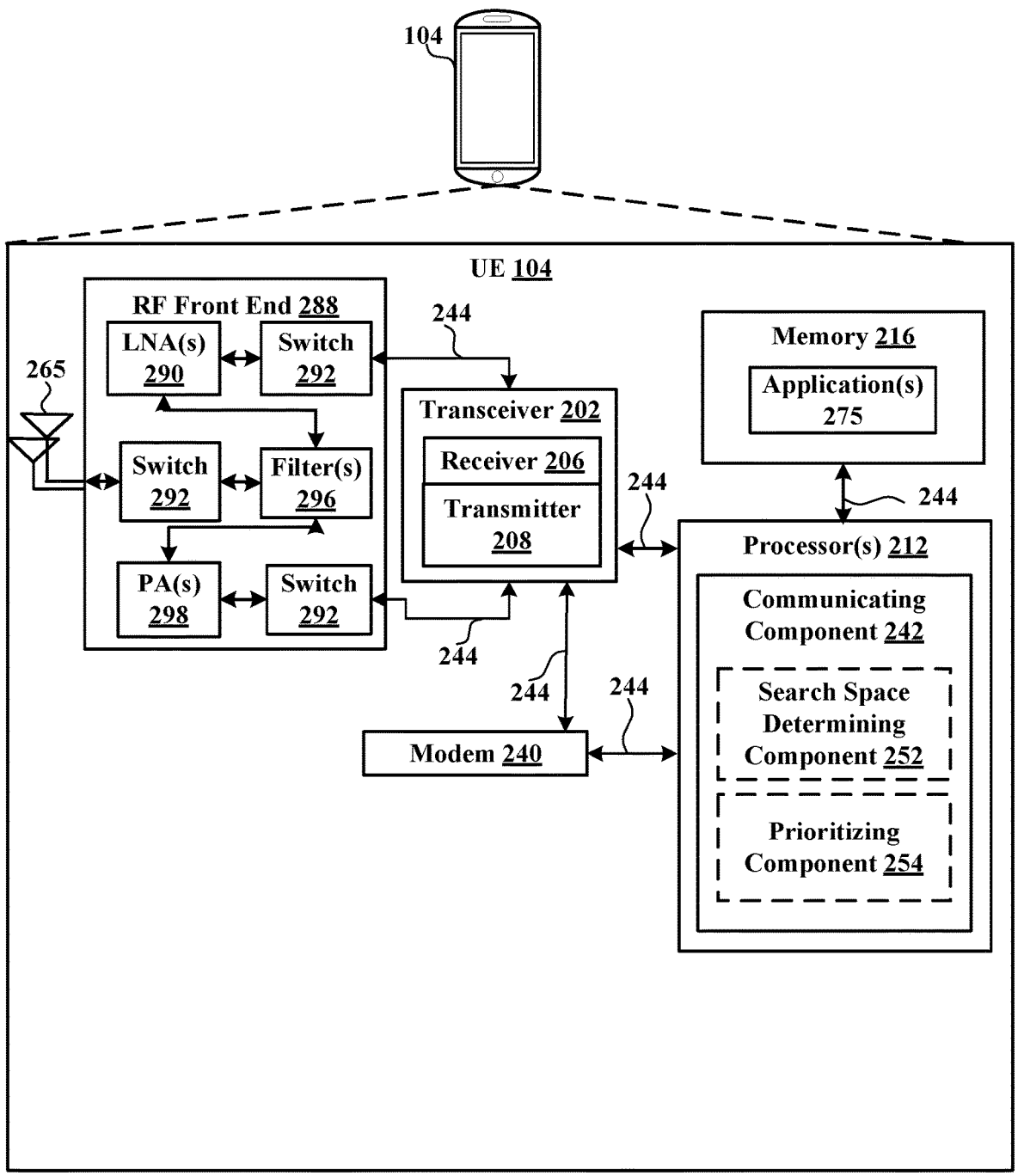
FIG. 2 is a block diagram illustrating an example of a UE, in accordance with various aspects of the present disclosure.
Figure 3:
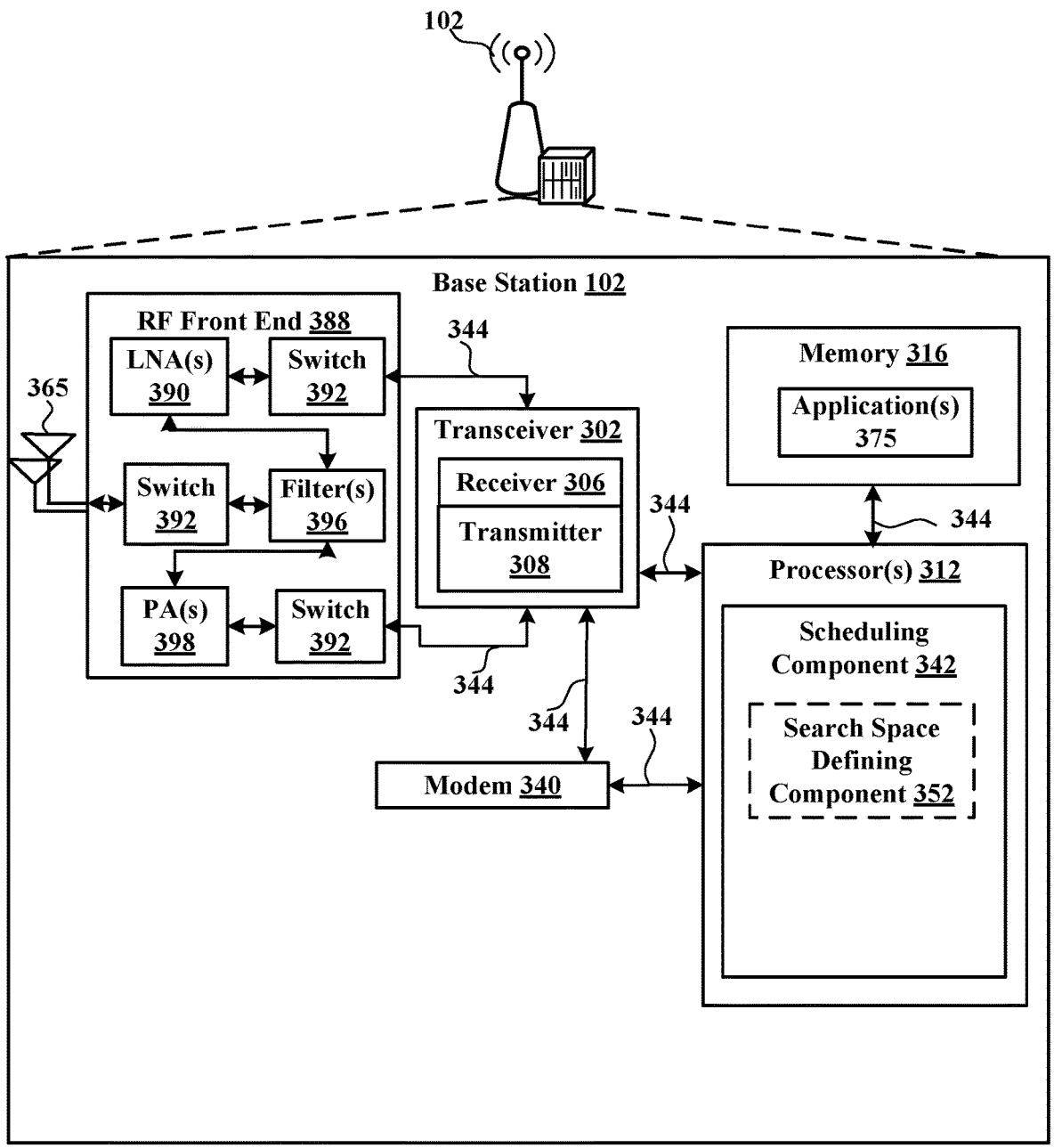
FIG. 3 is a block diagram illustrating an example of a base station, in accordance with various aspects of the present disclosure.
Figure 4:
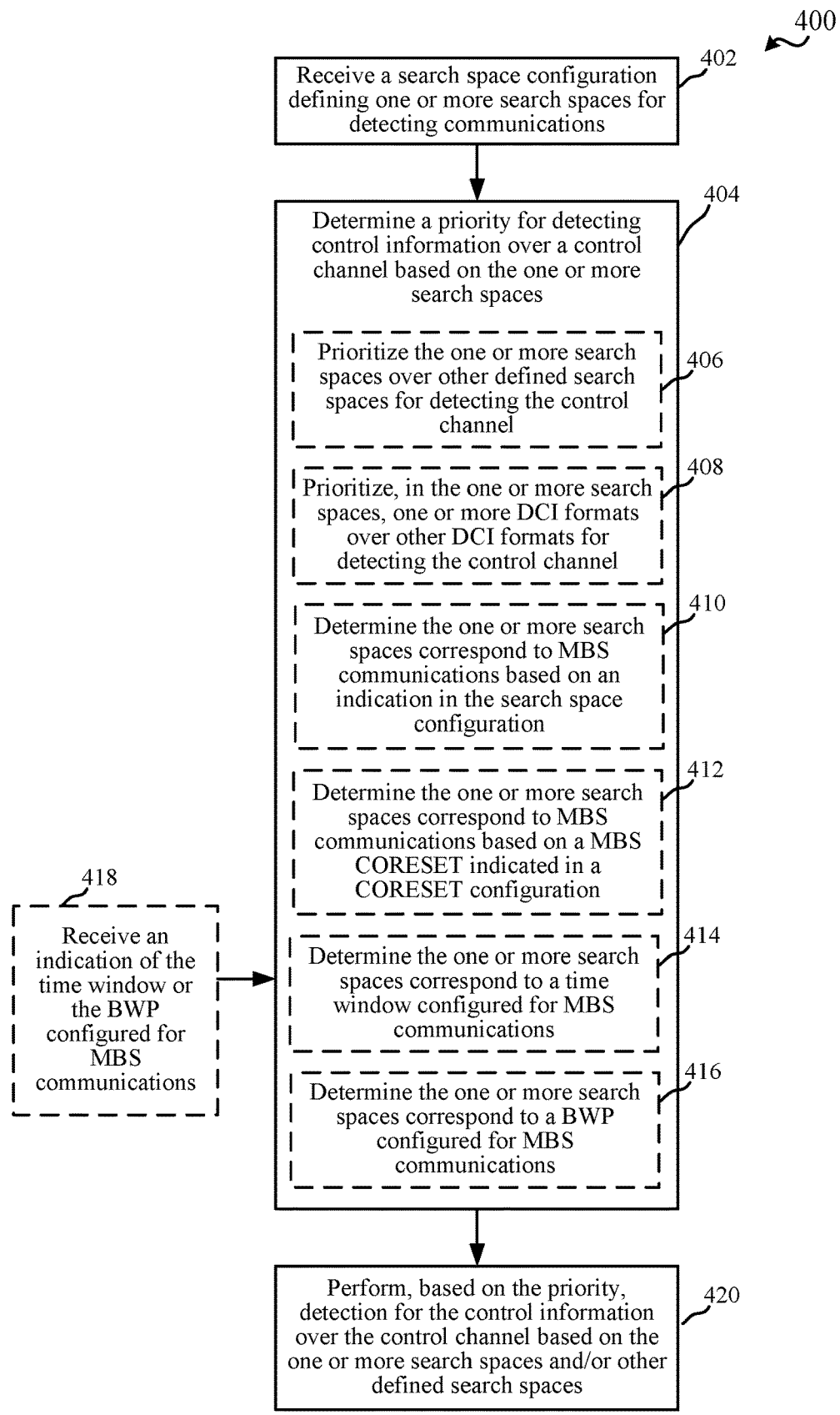
FIG. 4 is a flow chart illustrating an example of a method for determining search spaces for detecting multicast/broadcast service (MBS) downlink control information (DCI), in accordance with various aspects of the present disclosure.
Figure 5:
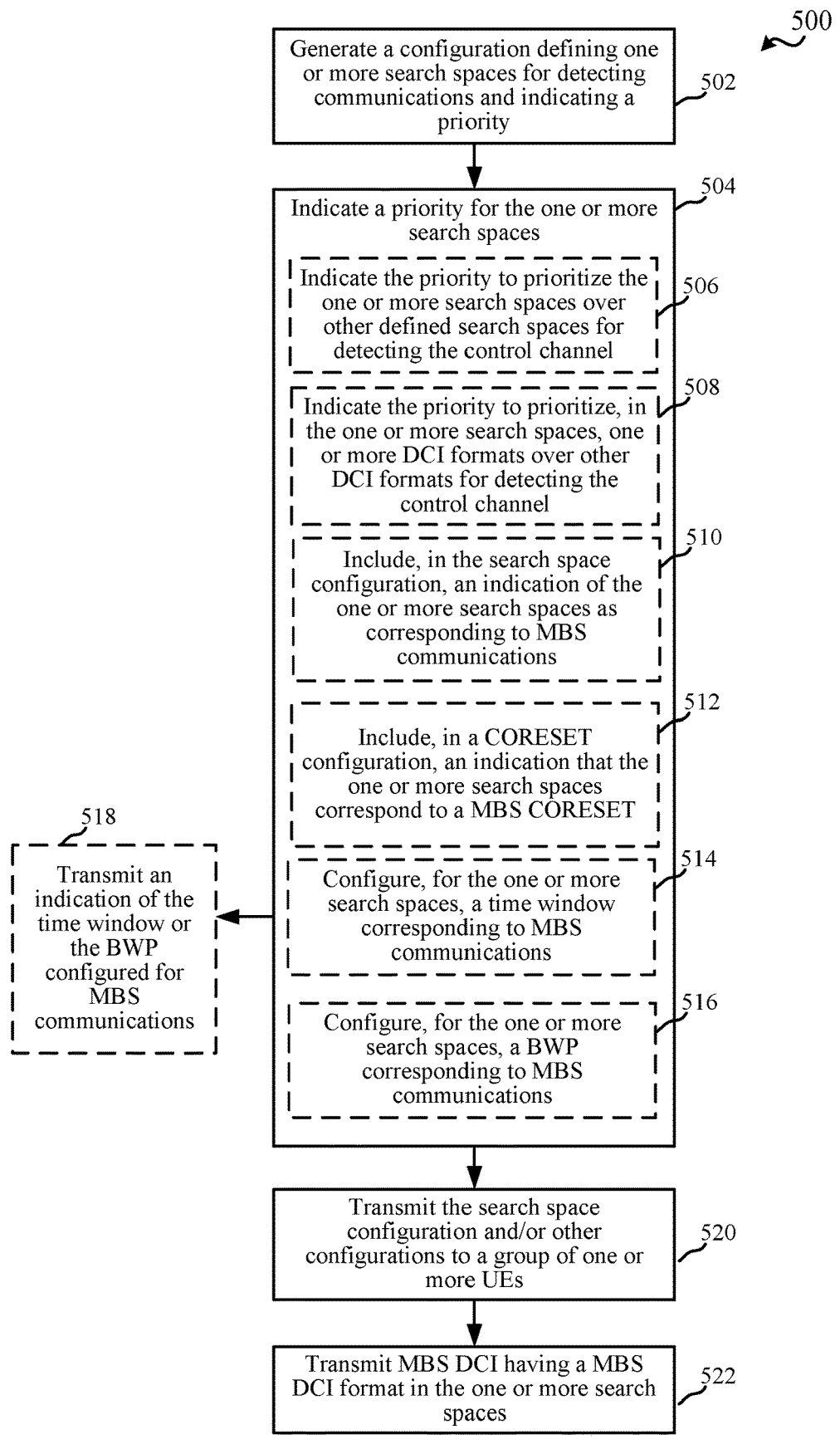
FIG. 5 is a flow chart illustrating an example of a method for generating a search space configuration for indicating MB S search space(s) for MB S DCI, in accordance with various aspects of the present disclosure.

Turning now to FIGS. 2-6, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for communicating with a base station 102 to receive MBS communications and/or receive DCI related to receiving MBS communications, as described further herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a search space determining component 252 for determining search spaces for attempting to detect DCI format signaling from a base station, and/or a prioritizing component 254 for prioritizing one of more of the search spaces or DCI formats for attempting to detect the DCI, as described further herein.

In an aspect, the processor(s) 212 may correspond to one or more of the processors described in connection with the UE in FIG. 6. Similarly, the memory 216 may correspond to the memory described in connection with the UE in FIG. 6.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and scheduling component 342 for transmitting MBS communications and/or transmitting DCI for receiving MBS communications, as described further herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, scheduling component 342 can optionally include a search space defining component 352 for defining search spaces for searching for DCI format signaling, and/or for indicating a priority for one or more of the search spaces, as described further herein.

In an aspect, the processor(s) 312 may correspond to one or more of the processors described in connection with the base station in FIG. 6. Similarly, the memory 316 may correspond to the memory described in connection with the base station in FIG. 6.

FIG. 4 illustrates a flow chart of an example of a method 400 for receiving a search space configuration for detecting DCI for MBS communications. In an example, a UE 104 can perform the functions described in method 400 using one or more of the components described in FIGS. 1-2.

In method 400, at Block 402, the UE can receive a search space configuration defining one or more search spaces for detecting communications. In an aspect, search space determining component 252, e.g., in conjunction with processor(s) 212, memory 216, transceiver 202, communicating component 242, etc., can receive the search space configuration defining one or more search spaces (e.g., a search space set) for detecting communications. For example, the search space configuration may be intended for a group of one or more UEs to receive and determine, from the configuration, one or more parameters defining the one or more search spaces. For example, the search space configuration may define search spaces for receiving MBS communications, search spaces for receiving unicast communications, etc., and may include CSSs, USSs, and/or related information. In one example, the search space configuration may define one or more search space sets in terms of configuration for time domain pattern for monitoring occasions (e.g., starting symbol, slot, periodicity, etc.), aggregation level, number candidate, USS or CSS and associated DCI formats, and/or the like, as described. In one example, search space determining component 252 can receive the search space configuration in system information broadcast by a base station 102 (e.g., in one or more system information blocks (SIBs)), radio resource control (RRC) signaling transmitted by the base station 102, etc.

In method 400, at Block 404, the UE can determine a priority for detecting control information over a control channel based on the one or more search spaces. In an aspect, prioritizing component 254, e.g., in conjunction with processor(s) 212, memory 216, transceiver 202, communicating component 242, etc., can determine the priority for detecting the control information over the control channel based on the one or more search spaces. For example, prioritizing component 254 can determine the priority based on determining that the one or more search spaces or corresponding DCI formats correspond to MBS communications, and can prioritize the search spaces and/or corresponding DCI formats that correspond to MBS communications over other search spaces and/or DCI formats (e.g., over those defined for unicast communications).

In determining the priority at Block 404, optionally at Block 406, the UE can prioritize the one or more search spaces over other defined search spaces for detecting the control channel. In an aspect, prioritizing component 254, e.g., in conjunction with processor(s) 212, memory 216, transceiver 202, communicating component 242, etc., can prioritize the one or more search spaces over other defined search spaces for detecting the control channel. For example, prioritizing component 254 can prioritize the one or more search spaces by searching the one or more search spaces for a control channel before searching the other search spaces. In one example, prioritizing component 254 can order the search spaces in a list, where the one or more search spaces can be ordered in the list before the other search spaces such that the one or more search spaces are searched first. In another example, prioritizing component 254 can rank the search spaces such that the one or more search spaces have a higher ranking than the other search spaces for determining an order for searching the search spaces for the control channel. In one example, the one or more search spaces can be prioritized based on determining that the one or more search spaces correspond to MBS communications. In one example, the other defined search spaces may correspond to unicast communications. Further, in an example, the one or more search spaces, the other defined search spaces, an indication that the one or more search spaces correspond to MBS communications, etc. may be configured in the search space configuration received from the base station 102 (e.g., at Block 402).

In determining the priority at Block 404, optionally at Block 408, the UE can prioritize, in the one or more search spaces, one or more DCI formats over other DCI formats for detecting the control channel. In an aspect, prioritizing component 254, e.g., in conjunction with processor(s) 212, memory 216, transceiver 202, communicating component 242, etc., can prioritize, in the one or more search spaces, the one or more DCI formats over the other DCI formats for detecting the control channel. For example, prioritizing component 254 can prioritize the one or more DCI formats (or related parameters) by attempting blind decoding of the one or more DCI formats before the other DCI formats. In one example, prioritizing component 254 can order the DCI formats (and related blind detection parameters) in a list, where the one or more DCI formats can be ordered in the list before the other DCI formats such that blind decoding is attempted based on the one or more DCI formats in the one or more search spaces before attempting blind decoding based on the other DCI formats. In another example, prioritizing component 254 can rank the DCI formats such that the one or more DCI formats have a higher ranking than the other DCI formats for determining an order for performing blind detection of the DCI formats related to the control channel. In one example, the one or more DCI formats can be prioritized based on determining that the one or more DCI formats correspond to MBS communications.

In an example, prioritizing component 254 can prioritize one or more DCI sizes configured for MBS communications, which may include prioritizing one or more fallback DCI format sizes, one or more non-fallback DCI sizes, etc. over DCI format sizes configured for other communications (e.g., unicast communications). In a specific example, prioritizing component 254 can prioritize two DCI sizes in the configured CSS/USS for DL MBS for reducing UE complexity (e.g., up to '3+1' DCI size budget for NR UEs). In this example, prioritizing component 254 can prioritize one fallback DCI format 1_0 (same size as DCI format 0_0), and one non-fallback DL DCI format 1_1 for use in performing blind decoding in the one or more search spaces.

In determining the priority at Block 404, optionally at Block 410, the UE can determine the one or more search spaces correspond to MBS communications based on an indication in the search space configuration. In an aspect, prioritizing component 254, e.g., in conjunction with processor(s) 212, memory 216, transceiver 202, communicating component 242, etc., can determine the one or more search spaces correspond to MBS communications based on the indication in the search space configuration. For example, the search space configuration can include, for the one or more search spaces, an explicit indication that the search space is for MBS communications. In one example, the indication may specify that the search space is for a specific search space type (e.g., for multicast control channel (MCCH), for multicast traffic channel (MTCH), etc.). In another example, the indication may specify that the search space is for a specific BWP that is dedicated for MBS communications. In any case, prioritizing component 254 can determine that the one or more search spaces correspond to MBS communications, based on the indication in the search space configuration, and can accordingly determine to prioritize the one or more search spaces.

In a specific example, in 5G NR, the configuration can include a SIB, which can indicate CSS for MCCH/MTCH in a common BWP for MBS and other system information (SI), paging, random access (RA), unicast, etc. communications. For example, the SIB may include a bwp-DownlinkCommon information element (IE), with parameters (e.g., other IEs) similar to the following:

```
Pdcch-ConfigCommon::=SEQUENCE {
    *controlResourceSetZero
    *commonControlResourceSet ControlResourceSet
    *searchSpaceZero
    *commonSearchSpaceList SEQUENCE (SIZE(1 . . .
        5)) OF SearchSpace
    *searchSpaceSIB1 SearchSpaceId
    *searchSpaceOtherSystemInformation SearchSpaceId
    *pagingSearchSpace SearchSpaceId
    *ra-SearchSpace SearchSpaceId
    *multicastSearchSpace SearchSpaceId
    . . .
}
``` where the SearchSpaceId being of a multicastSearchSpace type is added to facilitate identification (e.g., by the prioritizing component 254) of the search space as corresponding to MBS communications. Thus, in one example, search space determining component 252 can receive the configuration including one or more Pdcch-ConfigCommon IEs, one or more of which may have a multicastSearchSpace field, and prioritizing component 254 can determine to prioritize the search space indicated in the Pdcch-Config-Common IE based on the inclusion or valid value in the multicastSearchSpace field.

In addition, in an example, where the search space is indicated for MBS, the configuration may indicate alternate parameters for one or more of the IEs. In this example, the search space for MBS is associated with cell-specific common CORESET, similar as those for SIB, paging, random access, etc. communications. If the search space ID for MBS may be configured higher than other search space ID for SIB, paging, RA, etc. communications, where a higher search space ID may correspond to a lower priority, prioritizing component 254 can prioritize the detection of SIB, paging, RA, etc. configuration over that of MBS transmission in the overlapped region. For example, for MBS communications, the SearchSpace parameter defined in 5G NR can be modified to allow possible dci-Formats of: formats0-0-And-1-0, and/or format1-1 (e.g., but no need of format0-1-And-1-1, as defined for unicast communications). Moreover, in an example, search space determining component 252 can receive the SIB from the base station 102, which may indicate the configuration of MBS CSS for MCCH only, and the base station 102 can indicate, via MCCH (e.g., in the corresponding control data), configuration of MBS CSS/USS for MTCH. In this example, prioritizing component 254 can determine the one or more search spaces for MCCH based on the SIB and can determine the one or more search spaces for MTCH based on information received in MCCH, and can accordingly prioritize the search spaces for MCCH and MTCH over other search spaces.

In another example, CSS/USS for MBS can be introduced in Pdcch_Config or Pdcch_ConfigMulticast including CSS/USS configuration in a dedicated BWP or a MBS BWP, independent from that of unicast. In this example, prioritizing component 254 can determine the one or more search spaces from the SIB including the Pdcch_Config or Pdcch_ConfigMulticast, and may determine the one or more search spaces as related to MBS communications based on at least one of presence of the search space configuration in the Pdcch_ConfigMulticast, a MBS search space indicator, or association with a dedicated or MBS BWP known to be associated with MBS communications. The search space configuration for MCCH and MTCH may be different. For example, the search space for MCCH may be in Pdcch_ConfigCommon, indicated in SIB or RRC, but that of MTCH may be more flexible and configured in Pdcch_Config or Pdcch_ConfigMulticast, indicated in RRC or MCCH. There may be more than one search space of MCCH/MTCH for different services.

In determining the priority at Block 404, optionally at Block 412, the UE can determine the one or more search spaces correspond to MBS communications based on MBS CORESET indicated in a CORESET configuration. In an aspect, prioritizing component 254, e.g., in conjunction with processor(s) 212, memory 216, transceiver 202, communicating component 242, etc., can determine the one or more search spaces correspond to MBS communications based on the MBS CORESET in the CORESET configuration. In one example, communicating component 242 can receive one or more CORESET configurations indicating a set of resources (e.g., RBs) for monitoring for control data communications. In an example, communicating component 242 can receive the one or more CORESET configurations in system information broadcast from the base station 102 (e.g., in one or more SIBs), in RRC signaling, etc. For example, the CORESET can indicate resources over which the search space(s) in the search space configuration are defined. In an example, a specific CORESET can be configured for MBS and/or the CSS/USS associated with the CORESET can be used for monitoring DL grant for MBS with priority. In this example, prioritizing component 254 can determine the CORESET related to MBS communications and can accordingly prioritize the CORESET and/or search spaces corresponding to the CORESET.

In a specific example, in 5G NR, the configuration can include a SIB, which can indicate CORESET for MCCH and/or MTCH in a common BWP for MBS and other SI, paging, RA, unicast, etc. For example, the SIB may include a bwp-DownlinkCommon IE, with parameters (e.g., other IEs) similar to the following:

```
Pdcch-ConfigCommon::=SEQUENCE {
    *controlResourceSetZero
    *commonControlResourceSet ControlResourceSet
    *multicastControlResourceSet ControlResourceSet
    *searchSpaceZero
    *commonSearchSpaceList SEQUENCE (SIZE(1 . . .
        4)) OF SearchSpace
    *searchSpaceSIB1 SearchSpaceId
    *searchSpaceOtherSystemInformation SearchSpaceId
    *pagingSearchSpace SearchSpaceId
    *ra-SearchSpace SearchSpaceId
    . . .
}
``` where ControlResourceSet being of a mutlicastControlResourceSet type can be added, independent from the configuration of CORESET0 or common CORESET. Thus, in one example, communicating component 242 can receive the CORESET configuration including one or more Pdcch-ConfigCommon IEs, one or more of which may have a multicastControlResourceSet field, and prioritizing component 254 can determine to prioritize the CORESET or search spaces defined for the CORESET indicated in the Pdcch-ConfigCommon IE based on the inclusion or valid value in the multicastControlResourceSet field. In this example, where prioritizing component 254 determines that the ControlResourceSet is of a type, identifier, etc., associated with mutlicastControlResourceSet, prioritizing component 254 can determine that the CORESET is associated with MBS communications and can accordingly prioritize the CORE- SET and/or corresponding search spaces defined in the CORESET. In one example, prioritizing component 254 can determine the one or more search spaces for MCCH based on the CORESET and can determine the one or more search spaces for MTCH based on a configuration of MBS CORESET received in MCCH, and can accordingly prioritize the search spaces for MCCH and MTCH over other search spaces. In another example, CORESET for MBS can be introduced in Pdcch_Config or Pdcch_ConfigMulticast including CORESET configuration in a dedicated BWP or a MBS BWP, independent from that of unicast. In this example, prioritizing component 254 can determine the one or more search spaces from the SIB including the Pdcch_Config or Pdcch_ConfigMulticast, and may determine the one or more search spaces as related to MBS communications based on at least one of presence of the search space configuration in the Pdcch_ConfigMulticast, a MBS CORESET indicator, or association with a dedicated or MBS BWP known to be associated with MBS communications. The CORESET configuration for MCCH and MTCH may be different. For example, the CORESET for MCCH is in Pdcch_ConfigCommon, indicated in SIB or RRC, but that of MTCH is more flexible and configured in Pdcch_Config or Pdcch_ConfigMulticast, indicated in RRC or MCCH. There may be more than one CORESET of MCCH/MTCH for different services.

In determining the priority at Block 404, optionally at Block 414, the UE can determine the one or more search spaces correspond to a time window configured for MBS communications. In an aspect, prioritizing component 254, e.g., in conjunction with processor(s) 212, memory 216, transceiver 202, communicating component 242, etc., can determine the one or more search spaces correspond to the time window configured for MBS communications. In one example, certain time windows can be configured for MBS communications and/or for MBS search spaces, and prioritizing component 254 can determine to monitor for downlink grants for MBS, or to prioritize search spaces and/or corresponding DCI formats, based on determining that the time window is configured for MBS communications and/or for MBS search spaces. For example, the time window can be defined as one or more symbols, one or more slots each having one or more symbols, etc., and may be defined in the search space configuration, in a corresponding CORESET configuration, and/or the like (e.g., over the currently active BWP). In an example, based on determining the time window from the search space configuration, corresponding CORESET configuration, and/or the like, in this regard, prioritizing component 254 can determine that the one or more search spaces correspond to MBS communications and thus to prioritize the one or more search spaces.

In determining the priority at Block 404, optionally at Block 416, the UE can determine the one or more search spaces correspond to a BWP configured for MBS communications. In an aspect, prioritizing component 254, e.g., in conjunction with processor(s) 212, memory 216, transceiver 202, communicating component 242, etc., can determine the one or more search spaces correspond to the BWP configured for MBS communications. In one example, certain BWPs can be configured for MBS communications and/or for MBS search spaces, and prioritizing component 254 can determine to monitor for downlink grants for MBS, or to prioritize search spaces and/or corresponding DCI formats, based on determining that the BWP is configured for MBS communications and/or for MBS search spaces. In one example, the BWP for the search spaces may be defined in the search space configuration, in a corresponding CORESET configuration, and/or the like. In an example, based on determining the BWP from the search space configuration, corresponding CORESET configuration, and/or the like, in this regard, prioritizing component 254 can determine that the one or more search spaces correspond to MBS communications and thus to prioritize the one or more search spaces.

In method 400, optionally at Block 418, the UE can receive an indication of the time window or the BWP configured for MBS communications. In an aspect, communicating component 242, e.g., in conjunction with processor(s) 212, memory 216, transceiver 202, etc., can receive the indication of the time window or the BWP configured for MBS communications. In an example, communicating component 242 can receive the indication in RRC signaling, media access control (MAC) control element (CE), etc. received from the base station 102. In an example, the base station 102 can configure, and/or communicating component 242 can receive an indication of, the time window for MBS (e.g., switched on/off by RRC or MAC CE signaling to the UE 104) in an active BWP and/or the CORESET as well as CSS/USS within the time window, which can be used for monitoring DL grant for MBS with priority. In another example, the base station 102 can configure, and/or communicating component 242 can receive an indication of a specific BWP for MBS and/or the CORESET as well as CSS/USS belonging to the BWP, which can be used for monitoring DL grant for MBS with priority. For example, the configuration can including IEs (e.g., in SIB) similar to the following:

BWP-Downlink::=SEQUENCE {
  bwp-Id BWP-Id,
  *bwp-Common BWP-DownlinkCommon OPTIONAL,
    —Cond SetupOtherBWP
  *bwp-Dedicated BWP-DownlinkDedicated OPTIONAL,
    —Cond SetupOtherBWP
  *bwp-Multicast BWP-DownlinkMulticast OPTIONAL,
    —Cond SetupOtherBWP
  . . .
}
BWP-DownlinkMulticast::=SEQUENCE {
  *pdcch-Config CHOICE {
    release NULL,
    setup PDCCH-Config} OPTIONAL, —Need M
  *pdsch-Config CHOICE {
    release NULL,
    setup PDSCH-Config} OPTIONAL, —Need M
  . . .
} where BWP-DownlinkMulticast of bwp-Multicast type is added to indicate a BWP configured for MBS communications or otherwise MBS search spaces. Thus, in one example, communicating component 242 can receive the IEs in SIB (or RRC or MAC CE) signaling from the base station 102 configuration including BWP-DownlinkMulticast IEs, and prioritizing component 254 can determine to prioritize search spaces that are configured with the BWP indicated by the BWP-DownlinkMulticast IE. In either case, prioritizing component 254 can receive the indication of the time window and/or the BWP, and can determine to prioritize MBS search spaces and/or corresponding DCI formats for attempting to blind decode MBS DCI in time windows that match the indication and/or in BWPs that match the indication. In one example, search space determining component 252 can receive an indication of search spaces, as described above, and can determine that the search spaces correspond to MBS, but prioritizing component 254 may prioritize the search spaces corresponding to MBS only in the time windows and/or BWPs indicated as corresponding to MBS communications. The BWP configuration for MCCH and MTCH may be different. For example, the CORESET for MCCH is in bwp-Common, indicated in SIB or RRC, but that of MTCH is more flexible and configured in bwp-Dedicated or bwp-Multicast, indicated in RRC or MCCH. There may be more than one BWP of MCCH/MTCH for different services.

In method 400, at Block 420, the UE can perform, based on the priority, detection for the control information over the control channel based on the one or more search spaces and/or other defined search spaces. In an aspect, communicating component 242, e.g., in conjunction with processor(s) 212, memory 216, transceiver 202, etc., can perform, based on the priority, detection for the control information over the control channel (e.g., for the DCI format in the control channel) based on the one or more search spaces and/or other defined search spaces. For example, as described, performing the detection can include attempting blind detection/decoding over search spaces for MBS communications and/or based on a number of candidates for corresponding DCI formats for MBS communications first before attempting blind detection/decoding over other search spaces (e.g., for unicast communications) and/or based on other corresponding DCI formats (e.g., for unicast communications). Additionally, as described, communicating component 242 can apply a RNTI-based scrambling mask for each candidate in an attempt to detect the DCI.

In another example, search space configuration for MBS communications may indicate, for each of the one or more search spaces, a reduced number of candidates for blind decoding (e.g., as compared to for unicast or other communications). In one example, the search space configuration may indicate a reduced number of aggregation levels than for other communications. For example, the search space configuration may indicate large aggregation levels only for MBS communications (e.g., aggregation levels or 4, 8, and 16) to reduce the number of blind decodes for each MBS search space. In this example, communicating component 242 can attempt to detect the control channel by performing blind decoding based on the reduced number of aggregation levels. Further, in an example, the search space configuration may indicate a number of DCI sizes that may include a reduced number of DCI sizes (as compared to unicast or other types of communications). For example, the number of DCI sizes may include one fallback DCI size and one non-fallback DCI size to reduce the number of blind decoding candidates (and thus potentially the number of blind decodes). In other examples, the search space configuration can include other parameters for determining blind decoding candidates. In any case, communicating component 242 can perform the blind decoding based on the number of blind decoding candidates in an attempt to detect DCI over a control channel in the one or more search spaces. In addition, in an example, the search space configuration can be per component carrier (CC) and/or per MBS service type. Thus, for example, search space detecting component 252 can receive search space configurations for each of multiple CCs and/or MBS service types, and can accordingly prioritize MBS search spaces and/or corresponding DCIs over each of the multiple CCs and/or for each of the MBS service types.

FIG. 5 illustrates a flow chart of an example of a method 500 for generating search space configurations for MBS communications. In an example, a base station 102 can perform the functions described in method 500 using one or more of the components described in FIG. 1 or 3.

In method 500, at Block 502, the base station can generate a search space configuration defining one or more search spaces for detecting communications. In an aspect, search space defining component 352, e.g., in conjunction with processor(s) 312, memory 316, transceiver 302, scheduling component 342, etc., can generate the search space configuration defining the one or more search spaces for detecting communications. The search space configuration can indicate time domain patterns for monitoring occasions (e.g., starting symbols, slots, periodicities, etc.), aggregation levels, number candidate, USS or CSS and associated DCI formats, etc. for each of one or more search spaces. In one example, one or more of the search spaces in the search space configuration can be indicated (e.g., in the search space configuration or otherwise) as related to MBS communications.

In method 500, at Block 504, the base station can indicate a priority for the one or more search spaces. In an aspect, search space defining component 352, e.g., in conjunction with processor(s) 312, memory 316, transceiver 302, scheduling component 342, etc., can indicate the priority for the one or more search spaces. For example, search space defining component 352 can indicate the priority in the search space configuration or in other configurations or parameters, such as a CORESET, time window or BWP for certain types of communications, etc. In one example, search space defining component 352 can indicate priority for one or more search spaces corresponding to certain types of communications, and/or an indication of the type of communications corresponding to the one or more search spaces can be the indication of priority. For example, search space defining component 352 can indicate priority for one or more search spaces related to MBS communications and/or for DCI formats related to the one or more search spaces. The time window configuration for MCCH and MTCH may be different. For example, the time window for MCCH is indicated in SIB or RRC, but that of MTCH is more flexible and configured is indicated in RRC or MCCH. There may be more than one time window of MCCH/MTCH for different services.

In indicating the priority at Block 504, optionally at Block 506, the base station can indicate the priority to prioritize the one or more search spaces over other defined search spaces for detecting the control channel. In an aspect, search space defining component 352, e.g., in conjunction with processor(s) 312, memory 316, transceiver 302, scheduling component 342, etc., can indicate the priority to prioritize the one or more search spaces over other defined search spaces for detecting the control channel. As described, for example, indicating the priority can include indicating relationship between the one or more search spaces and MBS communications. This priority can be indicated in the search space configuration, in another configuration (e.g., for CORESET or to indicate a time window or BWP related to MBS communications, etc.), as described.

In indicating the priority at Block 504, optionally at Block 508, the base station can indicate the priority to prioritize, in the one or more search spaces, one or more DCI formats over other DCI formats for detecting the control channel. In an aspect, search space defining component 352, e.g., in conjunction with processor(s) 312, memory 316, transceiver 302, scheduling component 342, etc., can indicate the priority to prioritize, in the one or more search spaces, one or more DCI formats over other DCI formats for detecting the control channel. As described, for example, indicating the priority can include indicating relationship between the one or more DCI formats and MBS communications. For example, the relationship can be indicated for the search space(s) defined for the one or more DCI formats or specifically for each DCI format (e.g., as part of a DCI format configuration and/or the like). In any case, the priority can indicate priority for the one or more DCI formats for performing blind decoding in the search space(s) over the other DCI formats.

In indicating the priority at Block 504, optionally at Block 510, the base station can include, in the search space configuration, an indication of the one or more search spaces as corresponding to MBS communications. In an aspect, search space defining component 352, e.g., in conjunction with processor(s) 312, memory 316, transceiver 302, scheduling component 342, etc., can include, in the search space configuration, an indication of the one or more search spaces as corresponding to MBS communications. As described above, for example, the indication may include an IE in a SIB that indicates CSS for MCCH/MTCH in a common BWP for MBS and other SI, paging, RA, unicast, etc. communications. In addition, in an example, search space defining component 352 can indicate the configuration of MBS CSS for MCCH (and MCCH can indicate configuration of MBS CSS/USS for MTCH), and/or the CSS/USS for MBS can be introduced in a control channel configuration in a dedicated BWP or MBS BWP independent of unicast.

In indicating the priority at Block 504, optionally at Block 512, the base station can include, in a CORESET configuration, an indication that the one or more search spaces correspond to a MBS CORESET. In an aspect, search space defining component 352, e.g., in conjunction with processor(s) 312, memory 316, transceiver 302, scheduling component 342, etc., can include, in a CORESET configuration, an indication that the one or more search spaces correspond to a MBS CORESET. For example, search space defining component 352 can generate the CORESET configuration to indicate a MBS CORESET, as described, where the MBS CORESET can have one or more search spaces indicated, which can be determined to be for MBS communications (and accordingly prioritized). Moreover, as described in an example, search space defining component 352 can indicate the configuration of MBS CORESET for MCCH (and MCCH can indicate configuration of MBS CORESET for MTCH), and/or the CORESET for MBS can be introduced in a control channel configuration in a dedicated BWP or MBS BWP independent of unicast.

In indicating the priority at Block 504, optionally at Block 514, the base station can configure, for the one or more search spaces, a time window corresponding to MBS communications. In an aspect, search space defining component 352, e.g., in conjunction with processor(s) 312, memory 316, transceiver 302, scheduling component 342, etc., can configure, for the one or more search spaces, the time window corresponding to MBS communications. For example, search space defining component 352 can configure the time window as one or more symbols, one or more slots, etc. that are defined for MBS communications and/or are defined for prioritizing MBS search spaces (and/or corresponding DCI formats) over non-MBS search spaces (and/or corresponding DCI formats).

In another example, in indicating the priority at Block 504, optionally at Block 516, the base station can configure, for the one or more search spaces, a BWP corresponding to MBS communications. In an aspect, search space defining component 352, e.g., in conjunction with processor(s) 312, memory 316, transceiver 302, scheduling component 342, etc., can configure, for the one or more search spaces, the BWP corresponding to MBS communications. For example, search space defining component 352 can configure the BWP as defined for MBS communications and/or defined for prioritizing MBS search spaces (and/or corresponding DCI formats) over non-MB S search spaces (and/or corresponding DCI formats).

In method 500, optionally at Block 518, the base station can transmit an indication of the time window or the BWP configured for MBS communications. In an aspect, scheduling component 342, e.g., in conjunction with processor(s) 312, memory 316, transceiver 302, etc., can transmit the indication of the time window or the BWP configured for MBS communications (e.g., to one or more UEs). In this example, the one or more UEs can receive the indication of the time window and/or the BWP, and can accordingly determine whether to prioritize MBS search spaces (and/or corresponding DCI formats) based on whether a current time window and/or BWP correspond to those in the indication. As described, for example, scheduling component 342 can transmit the indication of the time window in RRC signal, MAC-CE, etc., in the active BWP and the CORESET as well as CSS/USS within the time window can be used for monitoring DL grant for MBS with priority. As described, in another example, scheduling component 342 can transmit the indication of the BWP in a SIB, and the CORESET as well as CSS/USS within the time window can be used for monitoring DL grant for MBS with priority.

In method 500, at Block 520, the base station can transmit the search space configuration, and/or other configurations, to a group of one or more UEs. In an aspect, scheduling component 342, e.g., in conjunction with processor(s) 312, memory 316, transceiver 302, etc., can transmit the search space configuration, and/or other configurations, to a group of one or more UEs. For example, scheduling component 342 can transmit the search space configurations and/or other configurations in SIB signals, RRC, MAC CE, etc., as described above. Moreover, as described, the other configurations can include CORESET configurations (which may indicate search spaces), time window configurations, BWP configurations, etc. In addition, for example, the search space configuration can be per CC and/or per MBS service type. Thus, for example, search space defining component 352 can define, and scheduling component 342 can transmit, search space configurations for each of multiple CCs and/or MBS service types.

In method 500, at Block 522, the base station can transmit MBS DCI having a MBS DCI format in the one or more search spaces. In an aspect, scheduling component 342, e.g., in conjunction with processor(s) 312, memory 316, transceiver 302, etc., can transmit the MBS DCI having the MBS DCI format in the one or more search spaces. For example, scheduling component 342 can transmit the MBS DCI in search spaces defined as corresponding to MBS communications. In one example, scheduling component 342 can scramble the MBS DCI with a RNTI (e.g., scramble a cyclic redundancy check (CRC) with an RNTI) before transmitting the MBS DCI in the MBS search space. The UE 104 can detect the MBS DCI, as described, and can determine the MBS DCI corresponds to MBS communications based on receiving the MBS DCI in the MBS search space, based on determining that the MBS DCI is of a MBS DCI format, based on a RNTI used to descramble the MBS DCI, and/or the like.

Figure 6:
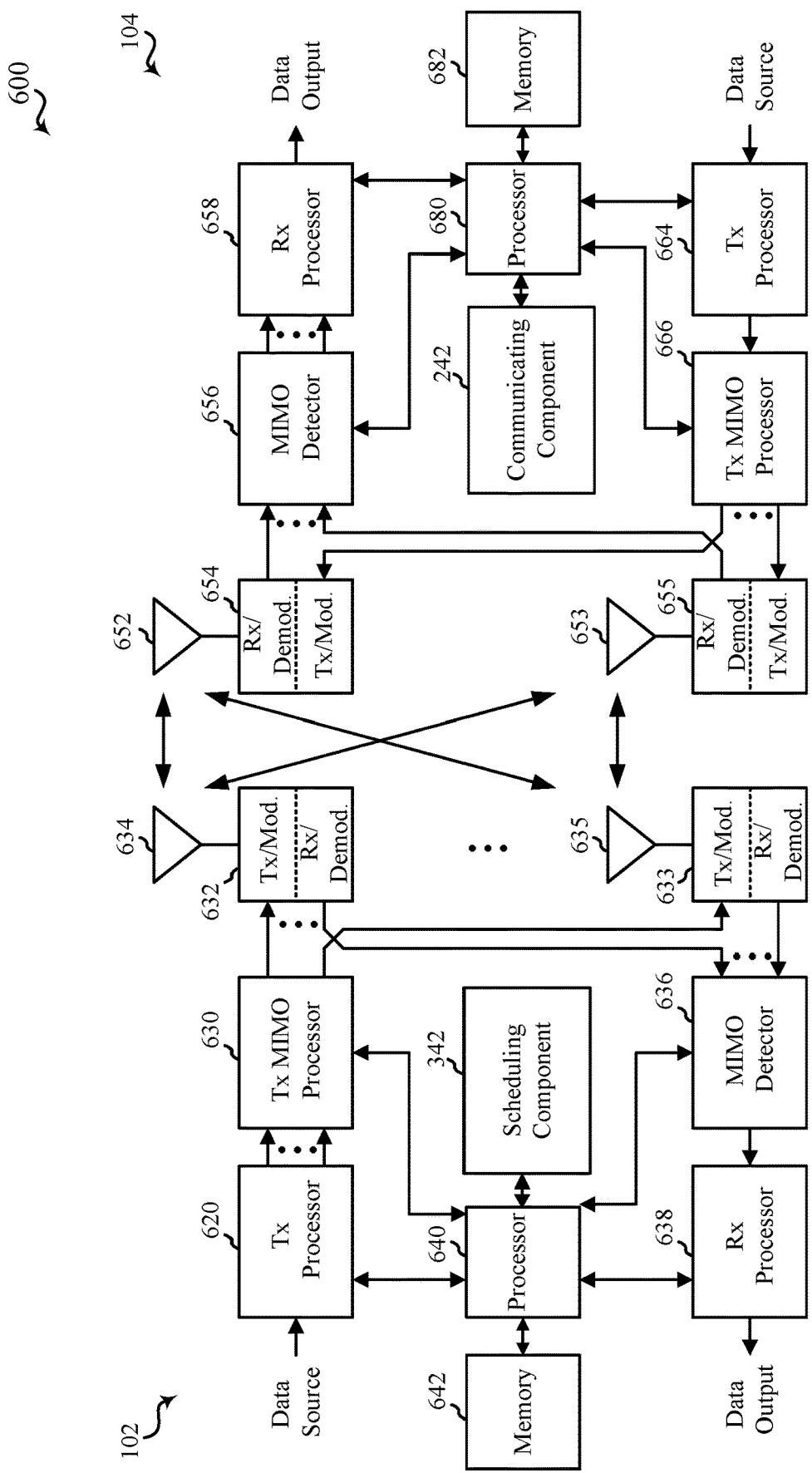
FIG. 6 is a block diagram illustrating an example of a MIMO communication system including a base station and a UE, in accordance with various aspects of the present disclosure.

FIG. 6 is a block diagram of a MIMO communication system 600 including a base station 102 and a UE 104. The MIMO communication system 600 may illustrate aspects of the wireless communication access network 100 described with reference to FIG. 1. The base station 102 may be an example of aspects of the base station 102 described with reference to FIG. 1. The base station 102 may be equipped with antennas 634 and 635, and the UE 104 may be equipped with antennas 652 and 653. In the MIMO communication system 600, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 620 may receive data from a data source. The transmit processor 620 may process the data. The transmit processor 620 may also generate control symbols or reference symbols. A transmit MIMO processor 630 may perform spatial processing (e.g., precoding) on data symbols, control symbols, or reference symbols, if applicable, and may provide output symbol streams to the transmit modulator/demodulators 632 and 633. Each modulator/demodulator 632 through 633 may process a respective output symbol stream (e.g., for OFDM, etc.) to obtain an output sample stream. Each modulator/demodulator 632 through 633 may further process (e.g., convert to analog, amplify, filter, and upconvert) the output sample stream to obtain a DL signal. In one example, DL signals from modulator/demodulators 632 and 633 may be transmitted via the antennas 634 and 635, respectively.

The UE 104 may be an example of aspects of the UEs 104 described with reference to FIGS. 1-2. At the UE 104, the UE antennas 652 and 653 may receive the DL signals from the base station 102 and may provide the received signals to the modulator/demodulators 654 and 655, respectively. Each modulator/demodulator 654 through 655 may condition (e.g., filter, amplify, downconvert, and digitize) a respective received signal to obtain input samples. Each modulator/demodulator 654 through 655 may further process the input samples (e.g., for OFDM, etc.) to obtain received symbols. A MIMO detector 656 may obtain received symbols from the modulator/demodulators 654 and 655, perform MIMO detection on the received symbols, if applicable, and provide detected symbols. A receive (Rx) processor 658 may process (e.g., demodulate, deinterleave, and decode) the detected symbols, providing decoded data for the UE 104 to a data output, and provide decoded control information to a processor 680, or memory 682.

The processor 680 may in some cases execute stored instructions to instantiate a communicating component 242 (see e.g., FIGS. 1 and 2).

On the uplink (UL), at the UE 104, a transmit processor 664 may receive and process data from a data source. The transmit processor 664 may also generate reference symbols for a reference signal. The symbols from the transmit processor 664 may be precoded by a transmit MIMO processor 666 if applicable, further processed by the modulator/demodulators 654 and 655 (e.g., for SC-FDMA, etc.), and be transmitted to the base station 102 in accordance with the communication parameters received from the base station 102. At the base station 102, the UL signals from the UE 104 may be received by the antennas 634 and 635, processed by the modulator/demodulators 632 and 633, detected by a MIMO detector 636 if applicable, and further processed by a receive processor 638. The receive processor 638 may provide decoded data to a data output and to the processor 640 or memory 642.

The processor 640 may in some cases execute stored instructions to instantiate a scheduling component 342 (see e.g., FIGS. 1 and 3).

The components of the UE 104 may, individually or collectively, be implemented with one or more application specific integrated circuits (ASICs) adapted to perform some or all of the applicable functions in hardware. Each of the noted modules may be a means for performing one or more functions related to operation of the MIMO communication system 600. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 600.

The following aspects are illustrative only and aspects thereof may be combined with aspects of other embodiments or teaching described herein, without limitation.

Aspect 1 is a method for wireless communication including receiving a search space configuration defining one or more search spaces for detecting communications intended for a group of one or more UEs, determining a priority for detecting control information transmitted over a control channel based on the one or more search spaces, wherein determining the priority comprises at least one of: prioritizing the one or more search spaces over other defined search spaces for detecting the control channel; or prioritizing, in the one or more search spaces, one or more control information formats over other control information formats of control information for detecting the control channel, and performing, based on the priority, detection for the control information over the control channel based on the one or more search spaces and/or the other defined search spaces.

In Aspect 2, the method of Aspect 1 includes wherein prioritizing the one or more search spaces is based at least in part on determining that the one or more search spaces correspond to MBS communications.

In Aspect 3, the method of any of Aspects 1 or 2 includes wherein prioritizing the one or more search spaces is based at least in part on determining that the one or more search spaces correspond to MBS communications based on an indication of the one or more search spaces as being of a MBS communication search space type in the search space configuration.

In Aspect 4, the method of Aspect 3 includes wherein the indication of the one or more search spaces indicates the one or more search spaces as corresponding to at least one of MBS control channel or MBS traffic channel.

In Aspect 5, the method of any of Aspects 3 or 4 includes wherein the indication of the one or more search spaces indicates the one or more search spaces as corresponding to a dedicated bandwidth part for MBS communications.

In Aspect 6, the method of any of Aspects 1 to 5 includes wherein prioritizing the one or more search spaces is based at least in part on determining that the one or more search spaces correspond to a MBS control resource set (CORESET) for MBS communications that is indicated in a CORESET configuration.

In Aspect 7, the method of Aspect 6 includes wherein the CORESET configuration indicates the MBS CORESET as corresponding to at least one of MBS control channel or MBS traffic channel.

In Aspect 8, the method of any of Aspects 6 or 7 includes wherein the CORESET configuration indicates the MBS CORESET as corresponding to a dedicated bandwidth part for MBS communications.

In Aspect 9, the method of any of Aspects 1 to 8 includes wherein prioritizing the one or more search spaces is based at least in part on determining that the one or more search spaces correspond to a time window configured for MBS communications.

In Aspect 10, the method of Aspect 9 includes receiving, in a radio resource control (RRC) signal or media access control (MAC) control element (CE), an indication of the time window.

In Aspect 11, the method of any of Aspects 1 to 10 includes wherein prioritizing the one or more search spaces is based at least in part on determining that the one or more search spaces correspond to a bandwidth part (BWP) that is specific for MBS communications.

In Aspect 12, the method of any of Aspects 1 to 11 includes wherein the search space configuration indicates a subset of candidates configured for the one or more search spaces.

In Aspect 13, the method of Aspect 12 includes wherein a subset of candidates is dependent on aggregation levels.

In Aspect 14, the method of any of Aspects 12 or 13 includes wherein a subset of candidates is dependent on format sizes.

In Aspect 15, the method of any of Aspects 1 to 14 includes wherein the search space configuration corresponds to one of multiple component carriers.

In Aspect 16, the method of any of Aspects 1 to 15 includes wherein the search space configuration corresponds to one of multiple MBS service types.

Aspect 17 is a method for wireless communication including generating a search space configuration defining one or more search spaces for detecting communications intended for a group of one or more user equipment (UEs), indicating a priority of the one or more search spaces for detecting a control channel to at least one of: prioritize the one or more search spaces over other defined search spaces for detecting the control channel; or prioritize, in the one or more search spaces, one or more control information formats over other control information formats of control information for detecting the control channel, and transmitting the search space configuration to the group of one or more UEs.

In Aspect 18, the method of Aspect 17 includes wherein indicating the priority is based at least in part on determining that the one or more search spaces correspond to MBS communications.

In Aspect 19, the method of any of Aspects 17 or 18 includes wherein indicating the priority comprises including, in the search space configuration, an indication of the one or more search spaces as being of a MBS communication search space type.

In Aspect 20, the method of Aspect 19 includes wherein the indication of the one or more search spaces indicates the one or more search spaces as corresponding to at least one of MBS control channel or MBS traffic channel.

In Aspect 21, the method of any of Aspects 19 or 20 includes wherein the indication of the one or more search spaces indicates the one or more search spaces as corresponding to a dedicated bandwidth part for MBS communications.

In Aspect 22, the method of any of Aspects 17 to 21 includes wherein indicating the priority comprises including, in a control resource set (CORESET) configuration, an indication that the one or more search spaces correspond to a MBS CORESET.

In Aspect 23, the method of Aspect 22 includes wherein the CORESET configuration indicates the MBS CORESET as corresponding to at least one of MBS control channel or MBS traffic channel.

In Aspect 24, the method of any of Aspects 22 or 23 includes wherein the CORESET configuration indicates the MBS CORESET as corresponding to a dedicated bandwidth part for MBS communications.

In Aspect 25, the method of any of Aspects 17 to 24 includes wherein indicating the priority comprises configuring, for the one or more search spaces, a time window corresponding to MBS communications.

In Aspect 26, the method of Aspect 25 includes transmitting, in a radio resource control (RRC) signal or media access control (MAC) control element (CE), an indication of the time window.

In Aspect 27, the method of any of Aspects 17 to 26 includes wherein indicating the priority comprises configuring, for the one or more search spaces, a bandwidth part (BWP) that is specific for MBS communications.

In Aspect 28, the method of any of Aspects 17 to 27 includes wherein generating the search space configuration comprises including a subset of candidates configured for the one or more search spaces.

In Aspect 29, the method of Aspect 28 includes wherein a subset of candidates is dependent on aggregation levels.

In Aspect 30, the method of any of Aspects 28 or 29 includes wherein a subset of candidates is dependent on format sizes.

In Aspect 31, the method of any of Aspects 17 to 30 includes wherein the search space configuration corresponds to one of multiple component carriers.

In Aspect 32, the method of any of Aspects 17 to 31 includes wherein the search space configuration corresponds to one of multiple MBS service types.

In Aspect 33, the method of any of Aspects 17 to 32 includes transmitting MBS downlink control information in the one or more search spaces.

Aspect 34 is an apparatus for wireless communication including a transceiver, a memory configured to store instructions, and one or more processors communicatively coupled with the memory and the transceiver, wherein the one or more processors are configured to perform one or more of the methods of any of Aspects 1 to 33.

Aspect is an apparatus for wireless communication including means for performing one or more of the methods of any of Aspects 1 to 33.

Aspect 36 is a computer-readable medium including code executable by one or more processors for wireless communications, the code including code for performing one or more of the methods of any of Aspects 1 to 33.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communication, comprising:
   receiving a search space configuration defining one or more search spaces for detecting communications intended for a group of one or more user equipment (UEs);
   determining, based on one or more search spaces corresponding to a multicast/broadcast service (MBS) control resource set (CORESET) for MBS communications that is indicated in a CORESET configuration, a priority for detecting control information transmitted over a control channel based on the one or more search spaces, wherein determining the priority comprises at least one of:
   prioritizing the one or more search spaces over other defined search spaces for detecting the control information over the control channel; or prioritizing, in the one or more search spaces, one or more control information formats over other control information formats of control information for detecting the control information over the control channel; and
   performing, based on the priority, detection for the control information over the control channel based on the one or more search spaces and/or the other defined search spaces.

2. The method of claim 1, wherein prioritizing the one or more search spaces is based at least in part on determining that the one or more search spaces correspond to multicast/broadcast service (MBS) communications.

3. The method of claim 1, wherein prioritizing the one or more search spaces is based at least in part on determining that the one or more search spaces correspond to multicast/broadcast service (MBS) communications based on an indication of the one or more search spaces as being of a MBS communication search space type in the search space configuration.

4. The method of claim 3, wherein the indication of the one or more search spaces indicates the one or more search spaces as corresponding to at least one of multicast control channel or multicast traffic channel.

5. The method of claim 3, wherein the indication of the one or more search spaces indicates the one or more search spaces as corresponding to a dedicated bandwidth part for MBS communications.

6. The method of claim 1, wherein the CORESET configuration indicates the MBS CORESET as corresponding to at least one of multicast control channel or multicast traffic channel.

7. The method of claim 1, wherein the CORESET configuration indicates the MBS CORESET as corresponding to a dedicated bandwidth part for MB S communications.

8. The method of claim 1, wherein prioritizing the one or more search spaces is based at least in part on determining that the one or more search spaces correspond to a bandwidth part (BWP) that is specific for multicast/broadcast service (MBS) communications.

9. The method of claim 1, wherein the search space configuration indicates a subset of candidates configured for the one or more search spaces.

10. The method of claim 9, wherein a subset of candidates is dependent on aggregation levels.

11. The method of claim 9, wherein a subset of candidates is dependent on format sizes.

12. The method of claim 1, wherein the search space configuration corresponds to one of multiple component carriers.

13. The method of claim 1, wherein the search space configuration corresponds to one of multiple multicast/broadcast service (MBS) service types.

14. A method for wireless communication, comprising:
generating a search space configuration defining one or more search spaces for detecting communications intended for a group of one or more user equipment (UEs);
indicating a priority of the one or more search spaces for detecting a control channel, at least in part by including in a control resource set (CORESET) configuration an indication that the one or more search spaces correspond to a multicast/broadcast service (MBS) CORESET, to at least one of:
prioritize the one or more search spaces over other defined search spaces for detecting control information over the control channel; or
prioritize, in the one or more search spaces, one or more control information formats over other control information formats of control information for detecting the control information over the control channel; and
transmitting the search space configuration to the group of one or more UEs.

15. The method of claim 14, wherein indicating the priority is based at least in part on determining that the one or more search spaces correspond to multicast/broadcast service (MBS) communications.

16. The method of claim 14, wherein indicating the priority comprises including, in the search space configuration, an indication of the one or more search spaces as being of a multicast/broadcast service (MBS) communication search space type.

17. The method of claim 16, wherein the indication of the one or more search spaces indicates the one or more search spaces as corresponding to a dedicated bandwidth part for MBS communications.

18. The method of claim 14, wherein indicating the priority comprises including, in the CORESET a control resource set (CORESET) configuration, an indication that the one or more search spaces correspond to the MBS a multicast/broadcast service (MBS) CORESET.

19. The method of claim 18, wherein the CORESET configuration indicates the MBS CORESET as corresponding to a dedicated bandwidth part for MBS communications.

20. The method of claim 14, wherein indicating the priority comprises configuring, for the one or more search spaces, a bandwidth part (BWP) that is specific for multicast/broadcast service (MBS) communications.

21. The method of claim 14, wherein generating the search space configuration comprises including a subset of candidates configured for the one or more search spaces.

22. The method of claim 21, wherein a subset of candidates is dependent on aggregation levels.

23. The method of claim 21, wherein a subset of candidates is dependent on format sizes.

24. The method of claim 14, wherein the search space configuration corresponds to one of multiple component carriers.

25. The method of claim 14, wherein the search space configuration corresponds to one of multiple multicast/broadcast service (MBS) service types.

26. The method of claim 14, further comprising transmitting multicast/broadcast service (MBS) downlink control information in the one or more search spaces.

27. An apparatus for wireless communication, comprising:
a transceiver; a memory configured to store instructions; and one or more processors communicatively coupled with the memory and the transceiver, wherein the one or more processors are configured to:
receive a search space configuration defining one or more search spaces for detecting communications intended for a group of one or more user equipment (UEs);
determine, based on one or more search spaces corresponding to a multicast/broadcast service (MBS) control resource set (CORESET) for MBS communications that is indicated in a CORESET configuration, a priority for detecting control information transmitted over a control channel based on the one or more search spaces, wherein determining the priority comprises at least one of:
prioritizing the one or more search spaces over other defined search spaces for detecting the control information over the control channel; or prioritizing, in the one or more search spaces, one or more control information formats over other control information formats of control information for detecting the control information over the control channel; and
perform, based on the priority, detection for the control information over the control channel based on the one or more search spaces and/or the other defined search spaces.

28. The apparatus of claim 27, wherein the one or more processors are configured to prioritize the one or more search spaces based at least in part on determining that the one or more search spaces correspond to multicast/broadcast service (MBS) communications.

29. An apparatus for wireless communication, comprising: a transceiver; a memory configured to store instructions; and one or more processors communicatively coupled with the memory and the transceiver, wherein the one or more processors are configured to:
generate a search space configuration defining one or more search spaces for detecting communications intended for a group of one or more user equipment (UEs);
indicate a priority of the one or more search spaces for detecting a control channel, at least in part by including in a control resource set (CORESET) configuration an indication that the one or more search spaces correspond to a multicast/broadcast service (MBS) CORESET, to at least one of:
prioritize the one or more search spaces over other defined search spaces for detecting control information over the control channel; or prioritize, in the one or more search spaces, one or more control information formats over other control information formats of control information for detecting the control information over the control channel; and transmit the search space configuration to the group of one or more UEs.

30. The apparatus of claim 27, wherein the CORESET configuration indicates the MBS CORESET as corresponding to at least one of multicast control channel or multicast traffic channel.

* * * * *